(No Model.)

H. B. BAKER.
NUT LOCK.

No. 383,268. Patented May 22, 1888.

WITNESSES
Phil C Masi.
Ben. Fugitt,

INVENTOR,
Henry B. Baker,
By Anderson & Smith,
Attorneys.

UNITED STATES PATENT OFFICE.

HENRY B. BAKER, OF NELSONVILLE, OHIO, ASSIGNOR OF ONE-HALF TO WILLIAM B. DEVORE, OF SAME PLACE.

NUT-LOCK.

SPECIFICATION forming part of Letters Patent No. 383,268, dated May 22, 1888.

Application filed January 19, 1887. Serial No. 224,776. (No model.)

*To all whom it may concern:*

Be it known that I, HENRY B. BAKER, a citizen of the United States, and resident of Nelsonville, in the county of Athens and State of Ohio, have invented certain new and useful Improvements in Nut-Locks; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
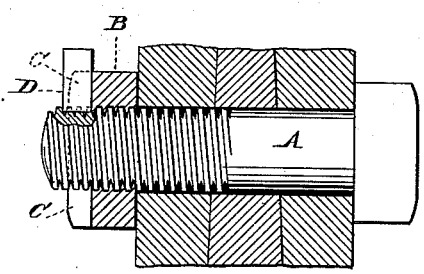
Figure 2:
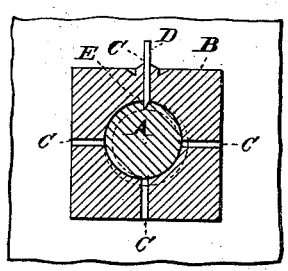

Figure 1 of the drawings is a representation of this invention, and is partly a section and partly a side view. Fig. 2 is a section, taken through the bolt and nut, showing the slots and key.

My invention relates to nut-locks; and it consists in the construction and novel combination of parts, as hereinafter set forth.

The object of the invention is to so lock the nut upon the bolt that the nut cannot be jarred loose, and at the same time to permit the fastening or fastenings by which the nut is secured in place upon the bolt to be readily withdrawn and again applied to secure the nut in place after the latter has been replaced upon the bolt again.

Referring by letter to the accompanying drawings, A designates a headed threaded bolt, which is designed to be used in connection with a nut, B, by which it is secured in its seat wherever it is designed to use it—such as in rail joints or in any other place. The nut B is provided in its outer face with one, two, three, or four radial slots, C, into which a steel chisel or slip, D, is placed. The inner end of the steel chisel or slip D is beveled to a sharp edge from one side only, as shown at E. The slip or chisel D after having been placed in the desired slot is then driven with a hammer to cause its bevel or cutting end or point to enter the threads on the bolt. A portion of the material of the nut is set up with a punch, so as to fasten the slip or chisel firmly in place. The outer end of the slip or chisel projects from its seat, so that said slip or chisel may be taken hold of by using pinchers to withdraw the slip from the slot in the nut when necessary or desirable to remove the nut from the bolt or for the purpose of tightening the nut.

The size and shape of the nut may be varied, and the number and sizes of the slips may also be varied to suit the sizes and places of use of the bolts and nuts to which the chisels or slips are applied.

Having described my invention, what I claim, and desire to secure by Letters Patent, is—

1. The combination, with the threaded bolt and the nut having a radial slot in the outer face thereof, of the chisel or slip driven through said radial slot into the threads of the bolt, and having portions of the nut upset against the faces of the slip at the outer end of the slot and inside of the outer end of the slip, substantially as specified.

2. The combination, with the threaded bolt, its bearing, and a nut having a radial slot in the outer face thereof, of the chisel or slip driven through said radial slot into the threads of the bolt, and having portions of the nut at the outer end of the slot upset against the faces of the chisel or slip inside of its outer end, substantially as specified.

3. The combination, with the threaded bolt, its bearing, and a nut provided with radial slots, of the steel slips or chisels placed in the radial slots and driven into the threads on the bolt, and having the material of the nut at the outer ends of the radial slots upset against the faces of said slips inside of their projecting ends, substantially as specified.

In testimony whereof I affix my signature in presence of two witnesses.

HENRY B. BAKER.

Witnesses:
W. C. HICKMAN,
JAMES L. McTRALLY.